US012676251B2

(12) United States Patent
Wang et al.

(10) Patent No.: US 12,676,251 B2
(45) Date of Patent: Jul. 7, 2026

(54) METHOD FOR PRODUCING WIRE HARNESS USING ADDITIVE MANUFACTURING, AND WIRE HARNESS

(71) Applicant: Changchun Jetty Automotive Technology Co., Ltd., Changchun (CN)

(72) Inventors: Chao Wang, Changchun (CN); Yun Miao, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 147 days.

(21) Appl. No.: 18/293,049

(22) PCT Filed: Jul. 15, 2022

(86) PCT No.: PCT/CN2022/105973

§ 371 (c)(1),
(2) Date: Jan. 29, 2024

(87) PCT Pub. No.: WO2023/005690

PCT Pub. Date: Feb. 2, 2023

(65) Prior Publication Data

US 2024/0221979 A1 Jul. 4, 2024

(30) Foreign Application Priority Data

Jul. 30, 2021 (CN) ........................ 202110875931.6

(51) Int. Cl.

| | |
|---|---|
| ***H01B 13/012*** | (2006.01) |
| ***H01B 1/04*** | (2006.01) |
| ***H01B 7/00*** | (2006.01) |

(52) U.S. Cl.
CPC ......... *H01B 13/01209* (2013.01); *H01B 1/04* (2013.01); *H01B 7/0045* (2013.01); *H01B 13/01254* (2013.01)

(58) Field of Classification Search
CPC .. H01B 13/01209; H01B 1/04; H01B 7/0045; H01B 13/01254; H01B 7/0823;
(Continued)

(56) References Cited

U.S. PATENT DOCUMENTS 3,737,990 A * 6/1973 Schut ....................... B21J 15/24
29/DIG. 33
5,724,730 A * 3/1998 Tanaka ............. B29C 45/14639
174/76
(Continued)

FOREIGN PATENT DOCUMENTS

CN 103733275 A 4/2014
CN 103814416 A 5/2014
(Continued)

OTHER PUBLICATIONS

Original and Translation of CN107696394 (Year: 2018).*
(Continued)

*Primary Examiner* — Timothy J. Dole
*Assistant Examiner* — Muhammed Azam
(74) *Attorney, Agent, or Firm* — LOZA & LOZA, LLP; Michael Fedrick

(57) ABSTRACT

A method for producing a wire harness, including Step S10: arranging a plurality of wire harness conductors; and Step S20: forming an insulator by additive manufacturing, gaps being disposed between the wire harness conductors, and the insulator wrapping the wire harness conductors and being filled in the gaps.

18 Claims, 4 Drawing Sheets

(58) Field of Classification Search
CPC ...... H01B 13/0013; H01B 13/00; H01B 7/02; H01B 7/17; H01B 13/06; H01B 13/22; B33Y 10/00; B33Y 80/00; Y02P 10/25
See application file for complete search history.

(56) References Cited

U.S. PATENT DOCUMENTS

| | | | | |
|---|---|---|---|---|
| 6,180,232 | B1 * | 1/2001 | McCullough | C22C 49/06 428/375 |
| 8,734,174 | B2 * | 5/2014 | Nakamura | H01R 43/18 439/271 |
| 8,770,968 | B2 * | 7/2014 | Mourou | H05B 6/36 425/547 |
| 9,263,165 | B2 * | 2/2016 | Yoshinaga | H02G 15/02 |
| 9,515,404 | B2 * | 12/2016 | Hoefner | H01R 13/521 |
| 9,893,454 | B2 * | 2/2018 | Tomita | H01R 13/4367 |
| 10,305,215 | B2 * | 5/2019 | Tomita | H01R 13/5845 |
| 10,350,790 | B2 * | 7/2019 | Koyanagi | B29C 33/3842 |
| 10,355,372 | B2 * | 7/2019 | Iizuka | H01R 13/405 |
| 10,483,730 | B2 * | 11/2019 | Bednarowski | H01L 23/142 |
| 10,772,203 | B2 * | 9/2020 | Ni | H01B 7/205 |
| 11,135,649 | B2 * | 10/2021 | Zhao | B33Y 10/00 |
| 11,361,881 | B2 * | 6/2022 | Wang | H01B 7/04 |
| 11,411,381 | B2 * | 8/2022 | Oyagi | H01R 12/53 |
| 2003/0214057 | A1 * | 11/2003 | Huang | B01L 3/502707 425/808 |
| 2005/0121222 | A1 * | 6/2005 | Lee | H01B 11/12 174/113 R |
| 2009/0266575 | A1 * | 10/2009 | Yoshimoto | H01B 7/0009 174/128.1 |
| 2012/0093468 | A1 * | 4/2012 | Keller | G02B 6/4411 385/106 |
| 2013/0000950 | A1 * | 1/2013 | Yamada | H01B 7/295 174/117 F |
| 2013/0020125 | A1 * | 1/2013 | Murata | H01B 7/2825 174/72 A |
| 2014/0131064 | A1 * | 5/2014 | Yamada | H01B 13/14 427/117 |
| 2014/0174787 | A1 * | 6/2014 | Zant | H02G 5/066 174/111 |
| 2016/0152197 | A1 * | 6/2016 | Kugimiya | H02G 3/0406 174/72 A |
| 2018/0088462 | A1 * | 3/2018 | Vyatskikh | G03F 7/40 |
| 2019/0118739 | A1 * | 4/2019 | Takamatsu | H01B 7/0045 |
| 2019/0148037 | A1 | 5/2019 | Leach et al. | |
| 2019/0333657 | A1 * | 10/2019 | Wang | H01B 13/06 |
| 2020/0381140 | A1 * | 12/2020 | Bilas | H01B 13/01209 |
| 2023/0154650 | A1 * | 5/2023 | Wang | H01B 13/06 439/519 |
| 2023/0390968 | A1 * | 12/2023 | Navarro Málaga | B29C 44/1228 |
| 2024/0105358 | A1 * | 3/2024 | Wang | H01B 7/0009 |
| 2024/0154393 | A1 * | 5/2024 | Wang | H02G 1/14 |
| 2024/0170186 | A1 * | 5/2024 | Wang | H01B 13/22 |
| 2024/0221979 | A1 * | 7/2024 | Wang | H01B 1/04 |
| 2024/0339248 | A1 * | 10/2024 | Wang | H05K 3/1275 |
| 2024/0339249 | A1 * | 10/2024 | Wang | H01B 13/012 |
| 2025/0006407 | A1 * | 1/2025 | Wang | H01B 7/0045 |

FOREIGN PATENT DOCUMENTS

| | | | | |
|---|---|---|---|---|
| CN | 103959403 | A | 7/2014 | |
| CN | 106653163 | A | 5/2017 | |
| CN | 107127928 | A | 9/2017 | |
| CN | 206505731 | U | 9/2017 | |
| CN | 207166113 | U | 3/2018 | |
| CN | 108973029 | A | 12/2018 | |
| CN | 109415021 | A | 3/2019 | |
| CN | 109774621 | A | 5/2019 | |
| CN | 109791814 | A | 5/2019 | |
| CN | 109866708 | A | 6/2019 | |
| CN | 110322988 | A | 10/2019 | |
| CN | 111478060 | A | 7/2020 | |
| CN | 111524649 | A | 8/2020 | |
| CN | 111710477 | A | 9/2020 | |
| CN | 112635109 | A | 4/2021 | |
| CN | 112735682 | A | 4/2021 | |
| CN | 113593753 | A | 11/2021 | |
| CN | 216388788 | U | 4/2022 | |
| DE | 102006021560 | A1 | 11/2007 | |
| DE | 102007024101 | A1 | 11/2008 | |
| JP | H06223645 | A | 8/1994 | |
| JP | 2002359912 | A | 12/2002 | |
| JP | 2013149369 | A | 8/2013 | |
| WO | WO-2018166555 | A1 * | 9/2018 | B23K 35/0261 |

OTHER PUBLICATIONS

Original and Translation of CN106128568 (Year: 2016).*
Original and Translation of CN107204216 (Year: 2017).*
First Office Action for counterpart Chinese Patent Application No. 202110875931.6, dated Sep. 15, 2022.
Extended European Search Report issued on Jan. 28, 2025 for counterpart European Patent Application No. 22848295.6, 10 pages.
International Search Report for corresponding International Patent Application No. PCT/CN2022/105973, dated Sep. 26, 2022.

* cited by examiner

METHOD FOR PRODUCING WIRE HARNESS USING ADDITIVE MANUFACTURING, AND WIRE HARNESS

CROSS REFERENCE TO RELATED APPLICATIONS

The present application is the U.S. national stage of International Patent Application No. PCT/CN2022/105973 filed on Jul. 15, 2022, which claims priority to Chinese Invention Patent Application No. CN202110875931.6, filed on Jul. 30, 2021, and entitled 'Wire harness production method and wire harness'. The disclosures of the foregoing applications are incorporated herein by reference in their entireties.

TECHNICAL FIELD

The present disclosure relates to the technical field of electronic components, and particularly to a method for producing a wire harness, and a wire harness.

BACKGROUND

Electrical connection needs to be realized by wire harness. The wire harness is mainly composed of electrical wires that are served as conductors. The electrical wires are produced through the processes of conductor drawing, stranding, annealing, extrusion molding of insulating layer and so on, so the production process is complex, and the processing cost is high. In addition, during the production of the wire harness using electrical wires, it is also necessary to cut the electrical wires to a fixed length, strip off the insulating layers, and then lay and fix the electrical wires one by one according to the loop requirements.

SUMMARY

An objective of the present disclosure is to provide a method for producing a wire harness, and a wire harness, so as to alleviate the technical problems of complex production process and high processing cost of a wire harness.

The above objective of the present disclosure can be achieved by the following technical solutions.

The present disclosure provides method for producing a wire harness, including: Step S10: arranging a plurality of wire harness conductors; and Step S20: forming an insulator by additive manufacturing, gaps being disposed between the wire harness conductors, and the insulator wrapping the wire harness conductors and being filled in the gaps.

The present disclosure provides a wire harness, which is produced by the method for producing a wire harness aforementioned. The wire harness includes wire harness conductors and an insulator, gaps are disposed between the wire harness conductors, and the insulator wraps the wire harness conductors and is filled in the gaps.

The present disclosure has the following characteristics and advantages:

In the method for producing a wire harness, a plurality of wire harness conductors are firstly arranged according to an electrical connection function to be realized, and then an insulator is formed by additive manufacturing to realize insulation and fixation. The conductive loop may be connected to an external electrical appliance to realize the electrical connection function of the wire harness. The wire harness production method has the following advantages:

(1) The step of extrusion-molding of the insulating layer of the electrical wire may be omitted, thereby shortening the processing time of the wire harness, reducing the cost of raw materials, and reducing the production cost of the electrical wire of the wire harness.

(2) The method for producing a wire harness is suitable for large-batch and automatic production, thereby improving production efficiency and realizing rapid production.

(3) The insulator may be integrally disposed around pre-arranged wire harness conductors to realize integral insulation, and the insulator can be conveniently and quickly disposed.

(4) The produced wire harness is convenient for being mounted and connected with external electrical appliances, thereby reducing the mounting man-hours and saving the space.

(5) The molding housing of a profile modeling structure may be adopted, and the shape of the molding housing is adapted to the mounting environment, which extends the application environment of the produced wire harness and makes the wire harness adaptable to different product structures, thereby facilitating the use of the wire harness on the electrical appliances in complex mounting environments.

(6) The molding housing may be a component of the electrical appliance, thereby realizing the integrated production of the component and the wire harness, and achieving the rapid mounting and dismounting of the wire harness.

BRIEF DESCRIPTION OF DRAWINGS

The following drawings are only for schematic illustration and explanation of the present disclosure, rather than limiting the scope thereof. In the drawings.

DESCRIPTION OF EMBODIMENTS

For a clearer understanding of the technical features, objectives and effects of the present disclosure, specific embodiments of the present disclosure will now be described with reference to the drawings. In the description of the present disclosure, unless otherwise specified, 'a plurality of' means two or more.

First Embodiments

Figure 1:
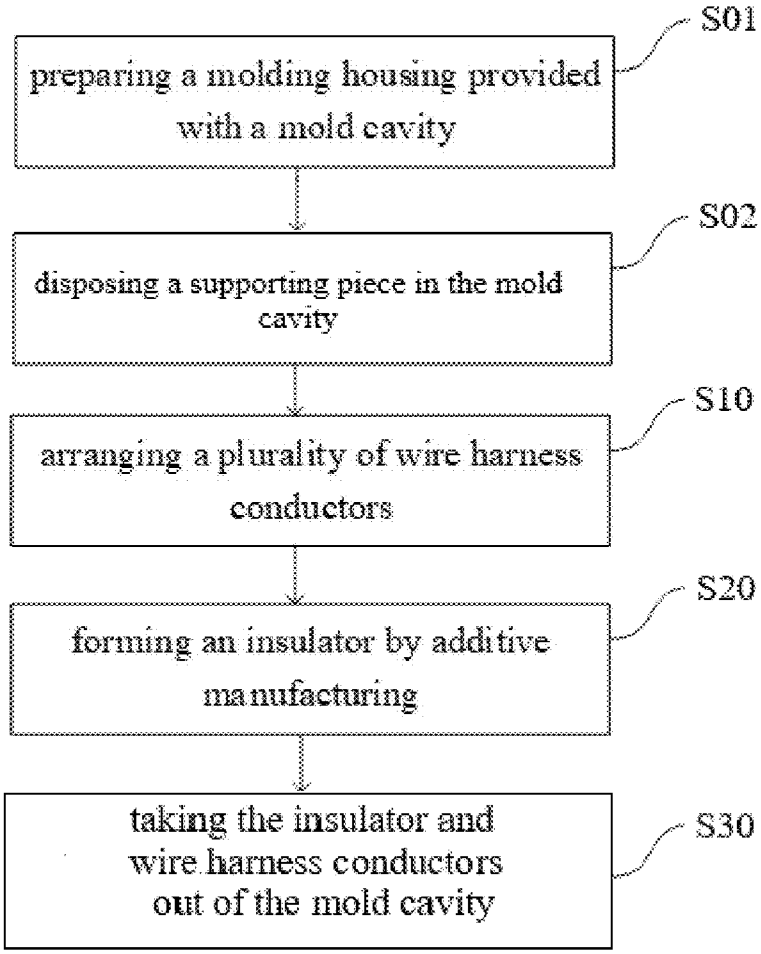
FIG. 1 illustrates a schematic structural diagram of a method for producing a wire harness according to the present disclosure.

The present disclosure provides a method for producing a wire harness, as illustrated in FIG. 1, including: Step S10: arranging a plurality of wire harness conductors 10; and Step S20: forming an insulator 20 by additive manufacturing, gaps 11 being disposed between the wire harness conductors 10, and the insulator 20 wrapping the wire harness conductors 10 and being filled in the gaps 11.

In the method for producing a wire harness, a plurality of wire harness conductors are firstly arranged according to an electrical connection function to be realized, and then an insulator 20 is additively formed to realize insulation and fixation. The conductive loop may be connected to an external electrical appliance to realize the electrical connection function of the wire harness. The method for producing a wire harness has the following advantages: (1) The step of extrusion-molding of the insulating layer of the electrical wire is omitted, the processing time of the wire harness is shortened, the cost of raw material is reduced, and the production cost of the electrical wire of the wire harness is reduced. (2) The method is suitable for large-batch and automatic production, thereby improving the production efficiency and realizing rapid production. (3) The insulator 20 may be integrally disposed around the pre-arranged wire harness conductors 10 to realize integral insulation, and the insulator 20 can be conveniently and quickly disposed. (4) The produced wire harness is convenient for being mounted and connected with external electrical appliances, thereby reducing the mounting man-hours and saving the space.

In an embodiment, Step S10 and Step S20 may be sequentially and alternately performed for multiple times, i.e., it is possible to arrange the wire harness conductors 10 and mold the insulator 20 for multiple times. In another embodiment, all the conductive wires of the wire harness are arranged at one time, and then the insulator 20 is formed, thereby improving the production efficiency.

A tail end of the wire harness conductor 10 may be connected to a gold finger, a crimping terminal, a welding terminal or a welding electrical wire to be conveniently connected to circuits of other electrical appliances.

Figure 4:
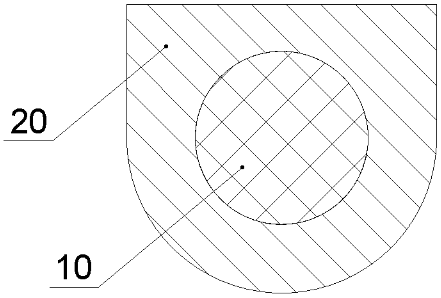
FIGS. 4 and 5 illustrate schematic partial views of a wire harness conductor and an insulator.
Figure 5:
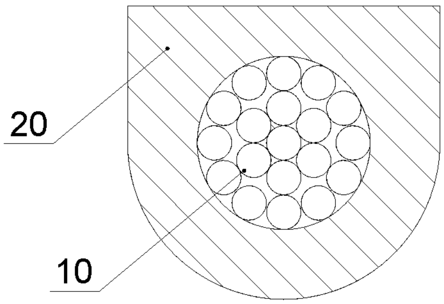

In the method for producing a wire harness, instead of providing an insulating sheath or an insulating paint on an outer side of the wire harness conductor 10, a unified insulator 20 may be formed by Step S20. In some embodiments, as illustrated in FIG. 4 that illustrates a schematic partial view of a wire harness produced by the method for producing a wire harness, in which the wire harness conductor 10 is a single-core structure, that is, the wire harness conductor 10 is a single conductive wire. In some embodiments, as illustrated in FIG. that illustrates a schematic partial view of a wire harness produced by the method for producing a wire harness, in which the wire harness conductor 10 is a multi-core structure, i.e., the wire harness conductor 10 includes a plurality of conductive wires, and exemplarily, the conductive wires are flexible conductive wires.

Figure 2:
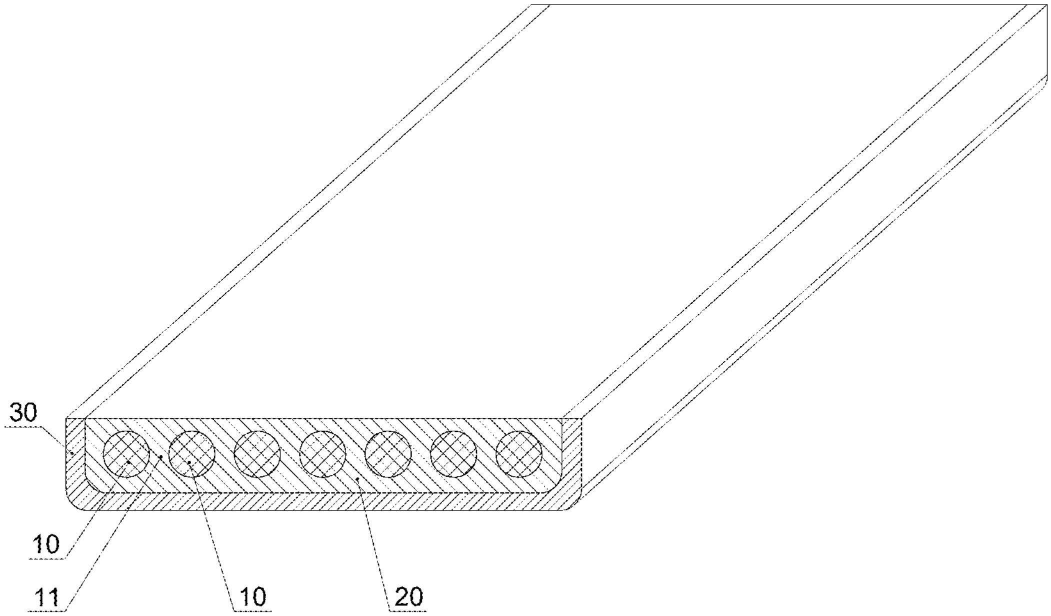
FIG. 2 illustrates a schematic working diagram of a method for producing a wire harness according to the present disclosure.
Figure 3:
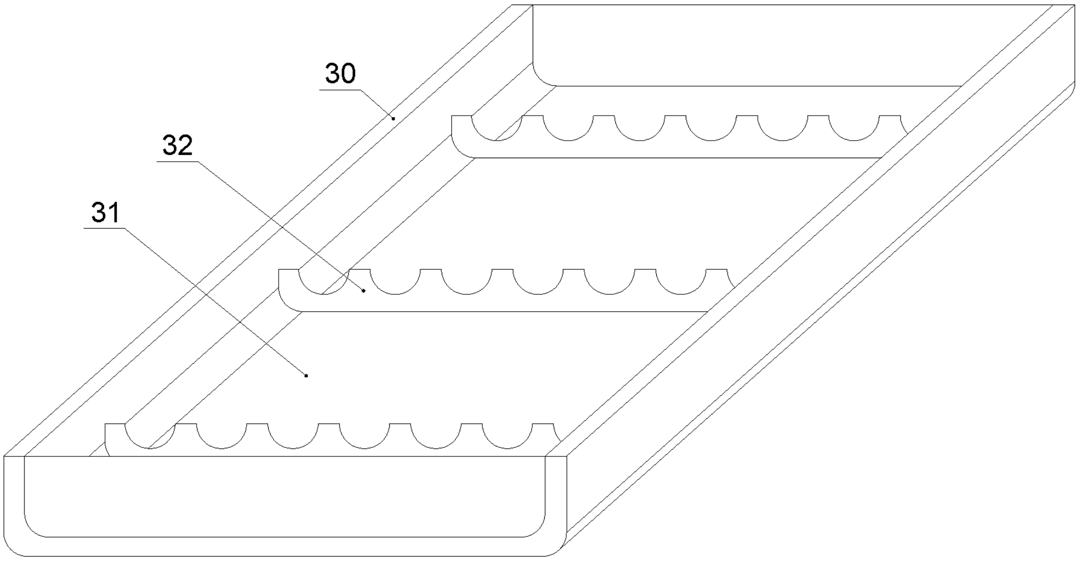
FIG. 3 illustrates a schematic structural diagram of a molding housing and a supporting piece in a method for producing a wire harness according to the present disclosure.

In an embodiment, the method for producing a wire harness includes Step S01 performed before Step S10, and Step S01 includes: preparing a molding housing 30 provided with a mold cavity 31. In Step S10, the wire harness conductors 10 are arranged in the mold cavity 31. In Step S20, the insulator 20 is formed in the mold cavity 31. As illustrated in FIGS. 2 and 3, the molding housing 30 defines the shape and size of the insulator 20, and the molding housing 30 conforming to the course of the wire harness conductor 10 is prepared according to the requirements of the wire harness to be produced.

In an embodiment, the wire harness conductor 10, the insulator 20 and the molding housing 30 form an integrated structure, i.e., the molding housing 30 serves as a part of the produced wire harness.

In another embodiment, the method for producing a wire harness includes Step S30 performed after Step S20, and Step S30 includes: taking the insulator 20 and the wrapped wire harness conductors 10 out of the mold cavity 31, and the molding housing 30 and the mold cavity 31 serve as tooling for producing the wire harness.

The molding housing 30 may be a profile modeling structure, the shape of which is adapted to the mounting environment. Under the condition that the molding housing 30 serves as tooling, the molded insulator 20 of the wire harness may be in a profile modeling structure, which extends the application environment of the produced wire harness and makes the wire harness adaptable to different product structures, thereby facilitating the use of the wire harness on the electrical appliances in complex mounting environments. Under the condition that the molding housing 30 serves as a part of the produced wire harness, the molding housing 30 can adapt to the application environment, which extends the application environment of the produced wire harness and makes the wire harness adaptable to different product structures, thereby facilitating the use of the wire harness on the electrical appliances in complex mounting environments.

Further, the molding housing 30 serves as a part of the produced wire harness, and is also a component of the electrical appliance, thereby realizing the integrated production of the component and the wire harness, and facilitating the rapid mounting and dismounting of the wire harness.

In an embodiment, in Step S10, the plurality of wire harness conductors 10 are disconnected from each other, each of which independently transmits current. In another embodiment, in Step S10, at least two of the wire harness conductors 10 are electrically connected by one or more selected from crimping, welding, 3D printing connection, laser sintering connection and connection point printing, so that the plurality of wire harness conductors 10 in the wire harness can realize the function of complex circuits.

In an embodiment, in Step S10, the wire harness conductor 10 may be extended along a straight line or a curved line. As illustrated in FIG. 2, the plurality of wire harness conductors 10 are distributed in a same plane.

In some other embodiments, in Step S10, the plurality of wire harness conductors are distributed and extended in a space, and for example, the wire harness is extended along a spatial curve.

In an embodiment, Step S10 adopts one or more selected from a 3D printing process, a laser powder sintering process, a metal injection molding process, a laser subtracting process, a conductive ink printing process and a printed circuit board process.

Specifically, both the 3D printing process and the laser powder sintering process are additive processes and use metal powder or a conductive material for melt printing, and the molding housing 30 may be used for molding. The metal injection molding process adopts a mold, so that the metal can be molded in the mold and then put into the mold cavity 31. The laser subtracting process is to cut off unnecessary parts from a sheet-shaped or foil-shaped metal material that has been shaped, leaving the wire harness conductor 10. The conductive ink printing process is to print conductive ink on a substrate to form a conductive loop, which together with the substrate is used as the wire harness conductor 10. The printed circuit board process is to obtain a conductive loop by etching a copper plate, and take the conductive loop as the wire harness conductor 10.

In another embodiment, in Step S10, the wire harness conductors 10 are arranged by being laid. A conductive wire may be selected as the wire harness conductor 10, and the selected conductive wire may be omitted from an insulating sheath and an insulating paint. Specifically, the wire harness conductors 10 may be laid by hand or by a device.

The method for producing a wire harness adopts a wire feeder 40. In step S10, the wire harness conductor 10 is delivered into the mold cavity 31 by the wire feeder 40, which is beneficial to ensuring the accuracy of the arrived position of the wire harness conductor 10. The wire feeder 40 can make a spatial arrangement of the wire harness conductors 10 in the mold cavity 31 and on supporting pieces 32.

Figure 6:
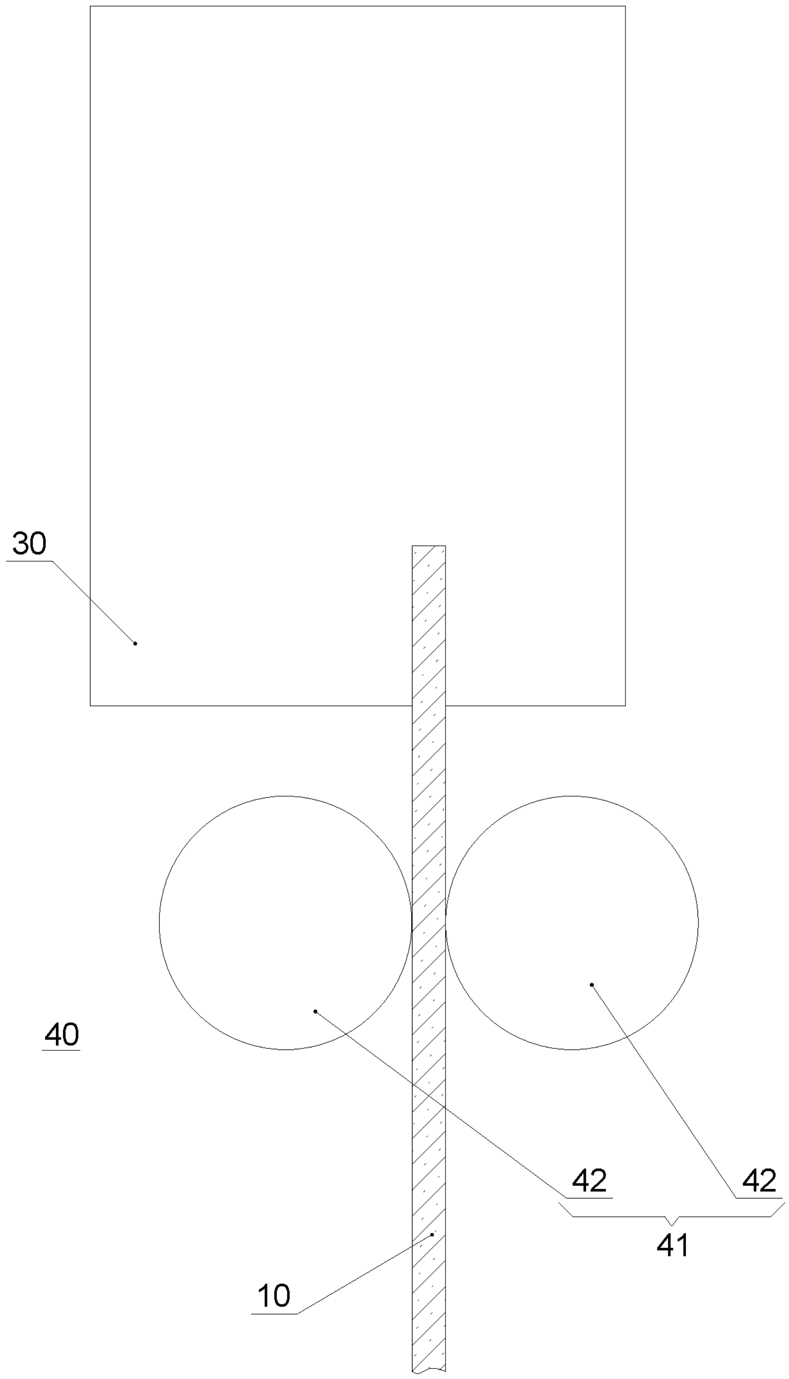
FIG. 6 illustrates a schematic diagram of a wire feeder in a method for producing a wire harness according to the present disclosure.

Further, the wire feeder 40 includes a roller mechanism 41, which includes at least two rollers 42 disposed at an interval. As illustrated in FIG. 6, the wire harness conductor 10 passes between the two rollers 42, and when the rollers 42 rotate, they drive the wire harness conductor 10 to translate into the mold cavity 31 by friction, thereby completing the arrangement of the wire harness conductor 10.

In an embodiment, the mold cavity 31 is provided therein with a supporting piece 32 which support the wire harness conductor 10 so that the insulator 20 surrounds the wire harness conductor 10, and the supporting piece 32 also plays a role of positioning the wire harness conductor 10. A plurality of supporting pieces 32 may be disposed in the mold cavity 31. The insulator 20 may form an integrated structure with the supporting pieces 32, and the supporting pieces 32 are taken as a part of the produced wire harness. The supporting piece 32 is exemplarily made of an insulating material, and more exemplarily, the supporting piece 32 and the insulator 20 are made of a same material. In Step S20, the insulator 20 is molded to wrap the wire harness conductor 10, and the supporting piece 32 is integrally formed with the insulating layer to better ensure the insulating performance of the wire harness.

In an embodiment, Step S20 adopts a 3D printing process, an injection molding process, a spraying process or a dip molding process to mold the insulator 20 around the wire harness conductor 10. Specifically, the 3D printing process is to melt and print an insulating material into the mold cavity 31. The injection molding process is to take an injection mold as the molding housing 30, and integrally injects an insulating material into the injection mold. The spraying process is to spray an insulating material on the conductor to form the insulating layer. The dip molding process is to immerse the mold cavity 31 and the conductor into an insulating material, so that the insulating material can adhere to the conductor. Exemplarily, the insulator 20 is molded using the molding housing 30. In some cases, for example, when the insulator 20 is formed by the dip molding, the molding housing 30 can be omitted.

Second Embodiments

The present disclosure provides a wire harness, which is produced by the above described method for producing a wire harness. The wire harness includes wire harness conductors 10 and an insulator 20, gaps 11 are disposed between the wire harness conductors 10, and the insulator 20 wraps the wire harness conductors 10 and is filled in the gaps 11.

In an embodiment, the wire harness conductor 10, the insulator 20 and the molding housing 30 form an integrated structure. Since some wire harnesses have complex shapes, the insulator 20 is filled in a way of integral insulation, so it is possible to omit multiple steps in the existing wire harness processing technology, thereby saving the processing time, improving the production efficiency and reducing the wire harness cost. Since the material of the insulator has certain adhesiveness, it is difficult to remove the molding housing. Therefore, when designing the wire harness, the molding housing 30 may be directly set as a part of the wire harness to form an integrated structure, and it is unnecessary to remove the molding housing 30 from the insulator 20.

The molding housing 30 may be a profile modeling structure, the shape of which is adapted to the mounting environment. Under the condition that the molding housing 30 serves as tooling, the molded insulator 20 of the wire harness may be in a profile modeling structure, which extends the application environment of the produced wire harness and makes the wire harness adaptable to different product structures, thereby facilitating the use of the wire harness on the electrical appliances in complex mounting environments. Under the condition that the molding housing 30 serves as a part of the produced wire harness, the molding housing 30 can adapt to the application environment, which extends the application environment of the produced wire harness and makes the wire harness adaptable to different product structures, thereby facilitating the use of the wire harness on the electrical appliances in complex mounting environments.

Further, the molding housing 30 serves as a part of the produced wire harness, and is also a component of the electrical appliance, thereby realizing the integrated production of the component and the wire harness, and facilitating the rapid mounting and dismounting of the wire harness.

In an embodiment, the plurality of wire harness conductors 10 are disconnected from each other, each of which independently transmits current. Alternatively, at least two of the wire harness conductors 10 are electrically connected by one or more selected from crimping, welding, 3D printing connection, laser sintering connection and connection point printing, so that the plurality of wire harness conductors 10 in the wire harness can realize the function of complex circuits.

In an embodiment, the wire harness conductor 10 may be extended along a straight line or a curved line. As illustrated in FIG. 2, the plurality of wire harness conductors 10 are distributed in a same plane. When the wire harness is connected to few electrical devices, two ends of the wire harness are connected to different electrical devices, and the wire harness conductors are extended according to an assembly route.

In an embodiment, the plurality of wire harness conductors are distributed in a same plane, or distributed and extended in a space. A complex wire harness has a plurality of branch structures that are used to be connected to different electrical devices. At present, electrical devices usually have a large planar or curved structure, so that the complex wire harness can be directly arranged on the electrical devices, which can also facilitate the pouring of the insulator 20.

In an embodiment, the insulator is provided with a supporting piece 32 including a side surface and a peripheral surface. The side surface and at least the peripheral surface are connected to the insulator 20, and the wire harness conductor 10 passes through the side surface or contacts the peripheral surface. During the arrangement of the wire harness conductors 10, some wire harness conductors 10 may have a long length and low hardness, so that middle parts of these wire harness conductors 10 will droop and contact the molding housing 30, and these wire harness conductor 10 will not be isolated from the molding housing 30 even if the insulator is filled, which causes short circuit of these wire harness conductors 10, resulting in a damage of the wire harness and even a safety accident. Therefore, in Step S02 performed before Step S10, a supporting piece is disposed in the mold cavity to support the wire harness conductor 10 to ensure that the filled insulator 20 can isolate the wire harness conductor 10 from the molding housing 30. In addition, when there are a plurality of wire harness conductors 10, they may be supported by the supporting pieces 32, so that the insulator 20 can fully isolate the wire harness conductors 10 from each other to ensure the accuracy of the loop of the wire harness.

The supporting piece 32 also plays a role of positioning the wire harness conductor 10. A plurality of supporting pieces 32 may be disposed in the mold cavity 31. The insulator 20 may form an integrated structure with the supporting pieces 32, and the supporting pieces 32 are taken as a part of the produced wire harness. The supporting piece 32 is exemplarily made of an insulating material, and more exemplarily, the supporting piece 32 and the insulator 20 are made of a same material. In Step S20, the insulator 20 is molded to wrap the wire harness conductor 10, and the supporting piece 32 is integrally formed with the insulating layer to better ensure the insulating performance of the wire harness.

In an embodiment, the insulator 20 is made of one or more selected from the group consisting of polyvinyl chloride, polyurethane, nylon, polypropylene, silicone rubber, cross-linked polyolefin, synthetic rubber, polyurethane elastomer, crosslinked polyethylene and polyethylene.

In an embodiment, the wire harness conductor 10 is made of a metal material, which is one or more selected from the group consisting of nickel or alloy thereof, cadmium or alloy thereof, zirconium or alloy thereof, chromium or alloy thereof, cobalt or alloy thereof, manganese or alloy thereof, aluminum or alloy thereof, tin or alloy thereof, titanium or alloy thereof, zinc or alloy thereof, copper or alloy thereof, silver or alloy thereof, and gold or alloy thereof. The most commonly used metal material for the conductor is copper or copper alloy, because the conductivity of copper is good among metals, and copper is not a precious metal while being convenient for processing and good in ductility. However, with the increasing price of copper, the material cost of the conductor made of copper is higher and higher. To this end, people begin to look for alternatives to copper to reduce the cost. The content of metallic aluminum in the earth's crust is about 7.73%, and the price of aluminum is relatively low due to the optimization of its refining technology. In addition, compared with copper, aluminum is lighter, and its conductivity is second only to copper, so that aluminum or aluminum alloy can partially replace copper or copper alloy in the field of electrical connection.

In an embodiment, the wire harness conductor 10 is made of anon-metal material, which is one or more selected from the group consisting of conductive ceramic, carbon-containing conductor, solid electrolyte, mixed conductor and conductive polymer material.

In an embodiment, the carbon-containing conductor is made of one or more selected from the group consisting of graphite powder, carbon nanotube material and graphene material.

In an embodiment, the wire harness conductor 10 has a cross-sectional area of 0.1 $mm^2$ to 260 $mm^2$. In the wire harness, the cross-sectional area of the wire harness conductor 10 determines the current that the wire harness conductor 10 can conduct. In general, a wire harness conductor 10 for signal conduction is able to conduct a small current and has a small cross-sectional area. For example, a wire harness conductor 10 of a signal wire in an automotive wire harness may have a minimum cross-sectional area of 0.1 $mm^2$. However, a wire harness conductor 10 for power conduction is able to conduct a large current and has a large cross-sectional area. For example, a wire harness conductor 10 of a wire harness of an automobile battery may have a maximum cross-sectional area of 260 $mm^2$. When having a small cross-sectional area, the wire harness conductor 10 may be laid by a wire feeder, and when having a large cross-sectional area, the wire harness conductor 10 may be 3D-printed, or the formed conductor 2 may be directly laid.

In an embodiment, the insulator 20 is made of one or more selected from the group consisting of polyvinyl chloride, polyurethane, nylon, polypropylene, silicone rubber, cross-linked polyolefin, synthetic rubber, polyurethane elastomer, crosslinked polyethylene and polyethylene.

In an embodiment, the insulator 20 has a breakdown strength of 0.3 KV/mm to 35 KV/mm. The breakdown strength is also called a dielectric breakdown strength, which means a highest electric-field strength that a material can withstand without being damaged (broken down) in an electric field. When the breakdown strength of the insulator 20 is lower than 0.3 KV/mm, some thin insulators 20 may be broken down under a normal voltage, resulting in invalid insulation. When the breakdown strength of the insulator 20 is higher than 35 KV/mm, the choice of a material with too high breakdown strength will increase the cost of an integrated wire harness assembly and cause design waste, because the general vehicle environment does not have high voltage greater than 35 KV.

In an embodiment, the insulator 20 has a thickness of 0.03 mm to 5 mm. If the thickness of the insulator 20 is less than 0.03 mm, it not only cannot ensure that the breakdown voltage of the insulator 20 is higher than the working voltage, but also cannot guarantee the wear resistance of the insulator 20, which causes the insulator 20 to be damaged after being scraped and abraded for many times with the wire harness conductor 10 being exposed, which will lead to a current leakage or a short circuit, resulting in a wire damage and a functional failure. When the thickness of the insulator 20 is 5 mm, the breakdown voltage, the insulation resistance and the wear resistance of the insulator 20 can meet the requirements. However, if the thickness is greater than 5 mm, the insulation layer will have defects such as air holes and collapse generated in the processing process due to the large thickness of the insulator 20, which degrades the performance of the insulation layer and wastes the material thereof, and increases the processing procedures and time. Therefore, the inventor chooses the thickness of the insulator 20 as 0.03 mm to 5 mm.

The wire harness can be adapted to large-batch and automatic production to improve the production efficiency and realize rapid production. In addition, integral insulation is realized and the insulator 20 can be conveniently and quickly disposed. The wire harness is convenient for being mounted and connected with external electrical appliances, reduces the mounting man-hours, is space-saving, allows to eliminate the step of extrusion-molding of the insulating layer of the electrical wire, shortens the processing time of the wire harness, reduces the cost of raw materials, and reduces the production cost of the wire harness.

Those described above are merely illustrative specific embodiments of the present disclosure, rather than limitations to the scope of the present disclosure. Any equivalent change or modification made by those skilled in the art without departing from the concept and principle of the present disclosure should fall within the protection scope of the present disclosure.

The invention claimed is:

1. A method for producing a wire harness, comprising:

Step S10: arranging a plurality of wire harness conductors; and

Step S20: forming an insulator by additive manufacturing, wherein gaps are disposed between the wire harness conductors, and wherein the insulator wraps the wire harness conductors and is filled in the gaps;

wherein the method further comprises Step S01 performed before the Step S10, the Step S01 comprising preparing a molding housing provided with a mold cavity, wherein in the Step S10 wire harness conductors are arranged in the mold cavity, and wherein in the Step S20 the insulator is formed in the mold cavity;

wherein the method further comprises Step S02 performed before the Step S10, wherein the Step S02 comprises disposing supporting pieces in the mold cavity at intervals along an axial direction of wire harness conductors for supporting the wire harness conductors, with each supporting piece comprising a side surface and a peripheral surface, wherein the side surfaces and the peripheral surfaces are connected to the insulator, wherein each of the wire harness conductors passes through the side surface or contacts the peripheral surface of a respective supporting piece, the insulator forms an integrated structure with the supporting pieces, the supporting pieces serve as a part of the produced wire harness, and the supporting pieces and the insulator are made of a same material; and wherein in the Step S10, at least two of wire harness conductors are electrically connected to each other to enable the plurality of wire harness conductors in the wire harness to realize a function of complex circuits.

2. The method for producing the wire harness according to claim 1, further comprising Step S30 performed after the Step S20, wherein the Step S30 comprises taking the insulator and the wrapped wire harness conductors out of the mold cavity.

3. The method for producing the wire harness according to claim 1, wherein in the Step S10, the plurality of wire harness conductors are disconnected from each other, or at least two of the wire harness conductors are electrically connected by one or more selected from crimping, welding, 3D printing connection, laser sintering connection and connection point printing.

4. The method for producing the wire harness according to claim 1, wherein in the Step S10, each of the wire harness conductors is extended along a straight line or a curved line.

5. The method for producing the wire harness according to claim 1, wherein in the Step S10, the plurality of wire harness conductors are distributed in a same plane, or are distributed and extended in a space.

6. The method for producing the wire harness according to claim 1, wherein the Step S10 is performed by a process selected from one or more of a 3D printing process, a laser powder sintering process, a metal injection molding process, a laser subtracting process, a conductive ink printing process and a printed circuit board process.

7. The method for producing the wire harness according to claim 1, wherein:

the method for producing the wire harness adopts a wire feeder; and in the Step S10, the wire harness conductors are delivered into the mold cavity by the wire feeder.

8. The method for producing the wire harness according to claim 1, wherein in the Step S20, the insulator is formed by a 3D printing process, an injection molding process, a spraying process or a dip molding process.

9. The method for producing the wire harness according to claim 1, wherein there are a plurality of supporting pieces disposed at intervals along an axis direction of the wire harness conductors in the cavity, and each of the supporting pieces has multiple recesses along an arrangement direction in which the multiple wire harness conductors are arranged at intervals.

10. A wire harness produced by the method for producing the wire harness according to claim 1, wherein the wire harness comprises the wire harness conductors and the insulator, the gaps are disposed between the wire harness conductors, and the insulator wraps the wire harness conductors and is filled in the gaps, supporting pieces are provided in the insulator at intervals along an axial direction of the wire harness conductors for supporting the wire harness conductors, each of the supporting piece comprises a side surface and a peripheral surface, wherein the side surface and the peripheral surface are connected to the insulator, the wire harness conductors pass through the side surface or contact the peripheral surface, the insulator forms an integrated structure with the supporting pieces, the supporting pieces serve as a part of the produced wire harness, and the supporting pieces and the insulator are made of a same material; and at least two of the wire harness conductors are electrically connected to each other to enable the plurality of wire harness conductors in the wire harness to realize a function of complex circuits.

11. The wire harness according to claim 10, wherein:

a molding housing is provided with a mold cavity;

the wire harness conductors are arranged in the mold cavity;

and the wire harness conductors, the insulator and the molding housing form an integrated structure.

12. The wire harness according to claim 10, wherein each of the wire harness conductors is extended along a straight line or a curved line.

13. The wire harness according to claim 10, wherein the plurality of wire harness conductors are distributed in a same plane, or distributed and extended in a space.

14. The wire harness according to claim 10, wherein a material of the wire harness conductors comprises a non-metal material, and wherein the non-metal material is selected from the group consisting of one or more of a conductive ceramic, a carbon-containing conductor, a solid electrolyte, a mixed conductor and a conductive polymer material.

15. The wire harness according to claim 14, wherein the carbon-containing conductor is selected from the group consisting of one or more of graphite powder, a carbon nanotube material and a graphene material.

16. The wire harness according to claim 10, wherein the insulator has a breakdown strength of 0.3 KV/mm to 35 KV/mm.

17. The wire harness according to claim 10, wherein the insulator has a thickness of 0.03 mm to 5 mm.

18. The wire harness according to claim 10, wherein there are a plurality of supporting pieces disposed at intervals along an axis direction of the wire harness conductors in the cavity, and each of the supporting pieces has multiple recesses along an arrangement direction in which the multiple wire harness conductors are arranged at intervals.

* * * * *